US008281907B2

(12) United States Patent
Fryska et al.

(10) Patent No.: US 8,281,907 B2
(45) Date of Patent: Oct. 9, 2012

(54) BRAKE ASSEMBLY HAVING MULTI-PIECE CORE AND REPLACEABLE FRICTION SURFACES

(75) Inventors: Slawomir T. Fryska, Granger, IN (US); Adam Mather, Bloomfield, MI (US); Raymond J. Cipra, West Lafayette, IN (US); Thomas H. Siegmund, West Lafayette, IN (US); Allen H. Simpson, Buchanan, MI (US); Mark L. LaForest, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 1344 days.

(21) Appl. No.: 11/987,647

(22) Filed: Dec. 3, 2007

(65) Prior Publication Data

US 2009/0139807 A1   Jun. 4, 2009

(51) Int. Cl.
*F16D 65/12* (2006.01)

(52) U.S. Cl. ............ 188/218 XL; 188/218 A; 29/419.1; 29/525.06

(58) Field of Classification Search .............. 188/218 A, 188/218 XL; 29/419.1, 525.06; 264/29.1, 264/29.5; 427/544
See application file for complete search history.

(56) References Cited

U.S. PATENT DOCUMENTS

| 3,237,731 A | * | 3/1966 | Du Bois ................. 188/218 XL |
| 3,726,374 A | * | 4/1973 | Warren et al. ............. 192/107 R |
| 3,746,139 A | * | 7/1973 | Bok et al. .................. 192/107 R |
| 3,753,476 A | * | 8/1973 | Dernovashek et al. ...... 188/73.2 |
| 3,757,907 A | * | 9/1973 | Crossman et al. ...... 188/218 XL |
| 3,800,392 A |   | 4/1974 | Cook et al. |
| 3,917,043 A | * | 11/1975 | Bok .......................... 192/107 R |
| 3,936,552 A | * | 2/1976 | Krupp et al. .................. 428/66.2 |
| 4,362,225 A |   | 12/1982 | Drott |
| 4,613,021 A |   | 9/1986 | Lacombe et al. |
| 4,674,616 A | * | 6/1987 | Mannino, Jr. ............. 192/107 R |
| 4,747,473 A | * | 5/1988 | Bok et al. ..................... 188/73.2 |
| 4,747,476 A | * | 5/1988 | East et al. ................ 192/107 M |
| 4,982,818 A |   | 1/1991 | Pigford |
| 5,184,387 A | * | 2/1993 | Lawton et al. ............... 29/419.1 |
| 5,558,186 A |   | 9/1996 | Hyde et al. |
| 5,599,603 A | * | 2/1997 | Evans et al. .................. 428/66.2 |

(Continued)

FOREIGN PATENT DOCUMENTS

EP   0 833 071 A2   4/1998

(Continued)

OTHER PUBLICATIONS

European Search Report from corresponding EP Application No. 08170015.5, mailed Dec. 28, 2010, 3 pages.

*Primary Examiner* — Christopher Schwartz
(74) *Attorney, Agent, or Firm* — Shumaker & Sieffert, P.A.

(57) ABSTRACT

A brake disk (10) includes an annular core (12, 60, 82) formed from a plurality of non-annular pieces (40, 66, 68, 84), a first friction disk (14) mounted on a first side of the annular core (12, 60, 82), a second friction disk (14) mounted on a second side of the core (12, 60, 82) opposite from the first friction disk (14), and at least one fastener (58) connecting the first and second friction disks (14, 14) to the core (12, 60, 82). Also a method of assembling a brake disk from a core and friction elements.

17 Claims, 5 Drawing Sheets

U.S. PATENT DOCUMENTS

| | | | |
|---|---|---|---|
| 5,769,185 A | 6/1998 | Main et al. | |
| 5,779,006 A * | 7/1998 | Hyde et al. | 188/250 D |
| 5,882,781 A * | 3/1999 | Lawton et al. | 428/293.1 |
| 5,900,297 A * | 5/1999 | Rudolph et al. | 428/66.2 |
| 6,308,397 B1 * | 10/2001 | Nishimura et al. | 29/469.5 |
| 6,691,393 B2 * | 2/2004 | James et al. | 29/419.1 |
| 6,932,199 B2 | 8/2005 | Emmett et al. | |
| 7,090,057 B2 | 8/2006 | Fryska et al. | |
| 7,104,366 B2 | 9/2006 | McAfee et al. | |
| 7,159,698 B2 * | 1/2007 | Banks et al. | 188/218 XL |
| 7,938,992 B2 * | 5/2011 | La Forest et al. | 264/29.5 |
| 2004/0074711 A1 | 4/2004 | Baylis | |
| 2005/0011706 A1 | 1/2005 | Johnson | |
| 2006/0260888 A1 | 11/2006 | Pham | |
| 2006/0261504 A1 * | 11/2006 | Simpson et al. | 264/29.1 |
| 2008/0135680 A1 * | 6/2008 | Scelsi et al. | 244/111 |
| 2009/0026027 A1 * | 1/2009 | Martino | 188/218 XL |
| 2009/0061085 A1 * | 3/2009 | Waghray et al. | 427/249.1 |
| 2010/0000070 A1 * | 1/2010 | La Forest et al. | 29/525.06 |
| 2010/0297360 A1 * | 11/2010 | Chang et al. | 427/544 |

FOREIGN PATENT DOCUMENTS

| | | |
|---|---|---|
| EP | 0 909 826 A1 | 4/1999 |

* cited by examiner

US 8,281,907 B2

BRAKE ASSEMBLY HAVING MULTI-PIECE CORE AND REPLACEABLE FRICTION SURFACES

FIELD OF THE INVENTION

The present invention is directed to a brake disk having a core supporting replaceable friction disks and toward a method of assembling same, and, more specifically, toward a brake disk having a core formed of multiple elements supporting replaceable friction disks and toward a method of assembling same.

BACKGROUND OF THE INVENTION

A known brake assembly often found on aircraft comprises a stack of interleaved disks. One set of disks is mounted to a fixed support in a spaced manner and forms the stators of the brake assembly. A second set of disks is mounted to rotate with a wheel and extend into the spaces between the stators; these disks comprise the rotors of the brake assembly. One or more pistons are provided for pressing a stator at one end of this disk stack to force the rotors and stators into frictional engagement to slow the wheel to which the rotors are attached.

Such rotors and stators may be formed from steel or, alternately, from materials referred to as "carbon-carbon composites." Carbon-carbon composites are preferred for some applications due to their ability to withstand higher temperatures than steel, their lower weight and their high specific heat capacity. Currently, to produce a carbon-carbon composite brake component, a chemical vapor deposition (CVD) process is generally used to densify a preform of carbon fibers, or a porous carbon-carbon composite. Such CVD processes require high temperatures and can be extremely time consuming and expensive. Known manufacturing methods may require months of process time for certain disk configurations, especially for relatively thick rotor and stator disks. This process therefore uses a significant amount of energy and can require long lead times for part production. Additionally, once the final carbon-carbon material is produced, a significant amount of machining is often required to produce the desired final geometry. Large amounts of machining result in wasted material as well worn machine tool parts. It would therefore be desirable to provide a brake disk and method of producing the same that is faster and less expensive to produce than a standard carbon-carbon composite brake disk.

SUMMARY OF THE INVENTION

These problems and others are addressed by embodiments of the present invention, a first aspect of which comprises a method that includes steps of determining a required shape of a discrete, annular, carbon-carbon composite article, forming a plurality of non-annular preforms capable of being assembled into an annular shape, densifying the preforms, and assembling the densified preforms to form the discrete, annular, carbon-carbon composite article.

Another aspect of the invention comprises a brake disk that has an annular core comprising an annular outer element and an annular inner element. The annular outer element has a first thickness and an inner periphery has a plurality of projections. The annular inner element has a plurality of notches complementary to the projections and is formed of a plurality of non-annular elements. The brake disk further includes a first friction disk mounted on a first side of the annular core, a second friction disk mounted on a second side of the core opposite from the first friction disk, and at least one fastener connecting the first and second friction disks to the core.

A further aspect of the invention comprises a method of assembling a carbon-carbon composite brake disk that involves forming a plurality of non-annular preforms having notches and that are capable of being assembled into an annular shape and densifying the preforms to form non-annular elements. The method further involves providing a restraint fixture, placing a first annular friction disk in the restraint fixture and placing on the first annular friction disk in the restraint fixture an annular core element having a plurality of protrusions having a shape along an inner or outer periphery thereof. The plurality of non-annular elements are placed into the restraint fixture with the notches engaging the protrusions to form the annular shape. The method further includes steps of placing a second annular friction disk on the annular core element and connecting the first and second friction disks.

BRIEF DESCRIPTION OF THE DRAWINGS

These aspects and features of the invention and others will be better understood after a reading of the following detailed description together with the attached drawings wherein.

DETAILED DESCRIPTION

Figure 1:
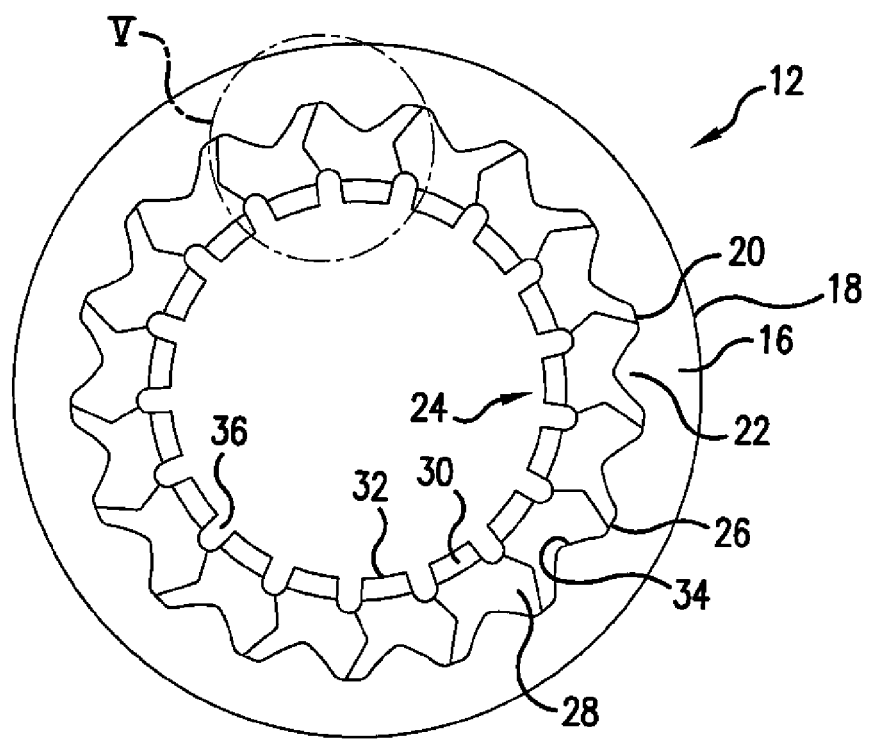
FIG. 1 is a top plan view of a core element comprising an annular outer member and a plurality of inner pieces according to an embodiment of the present invention intended for a brake stator with load transfer lugs at the inner perimeter.
Figure 2:
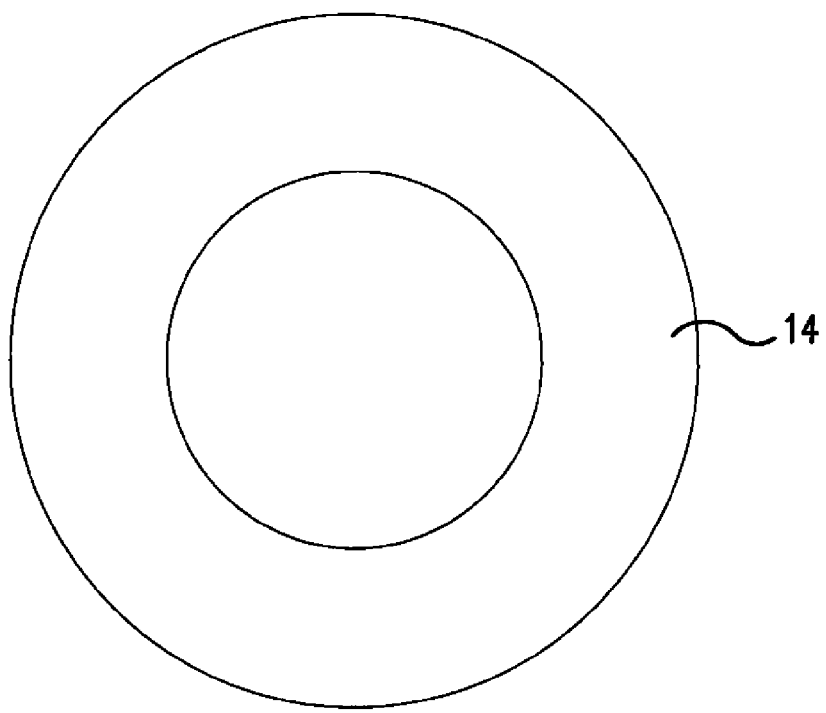
FIG. 2 is a top plan view of a first friction disk according to an embodiment of the present invention.
Figure 4:
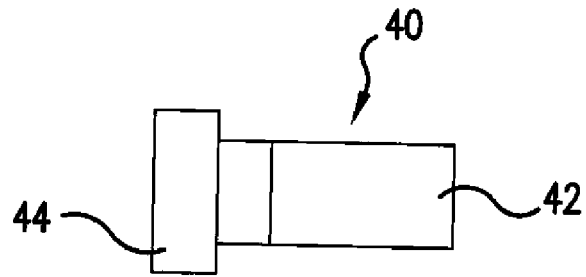
FIG. 4 is a side elevational view of the inner piece of FIG. 3.
Figure 6:
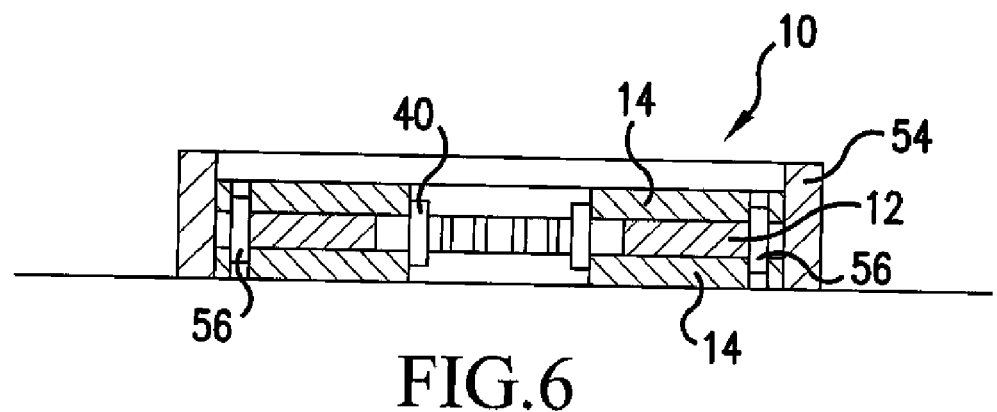
FIG. 6 is a side elevational view, partly in section, of two of the friction disks of FIG. 2 mounted on the core of FIG. 1 and retained in a restraint fixture.

Referring now to the drawings, wherein the showings are for purposes of illustrating embodiments of the invention only and not for the purpose of limiting same, FIG. 6 illustrates a brake disk 10 comprising a core element 12, illustrated in FIG. 1, and two frictions disks 14, illustrated in FIG. 2. Brake disk 10 comprises a stator for an aircraft brake system, but a rotor could be formed in a generally similar manner. With reference to FIG. 1, core element 12 comprises an annular outer element 16 having an outer periphery 18 and an inner periphery 20. Inner periphery 20 includes a plurality of protrusions 22 each having an approximately triangular shape. Core element 12 further includes an inner element 24 having an outer periphery 26, a thin portion 28, a thick portion 30 and an inner periphery 32. Inner core element outer periphery 26 includes a plurality of notches 34 each shaped to receive one of the protrusions 22 of the annular outer core element 16, and inner core element inner periphery 32 includes a plurality of slots 36 for engaging lugs (not shown)

on a wheel support (not shown). As is apparent from FIG. 4, thick portion 30 extends out from both sides of thin portion 28 and provides inner core element 24 with a roughly T-shaped cross section.

Figure 5:
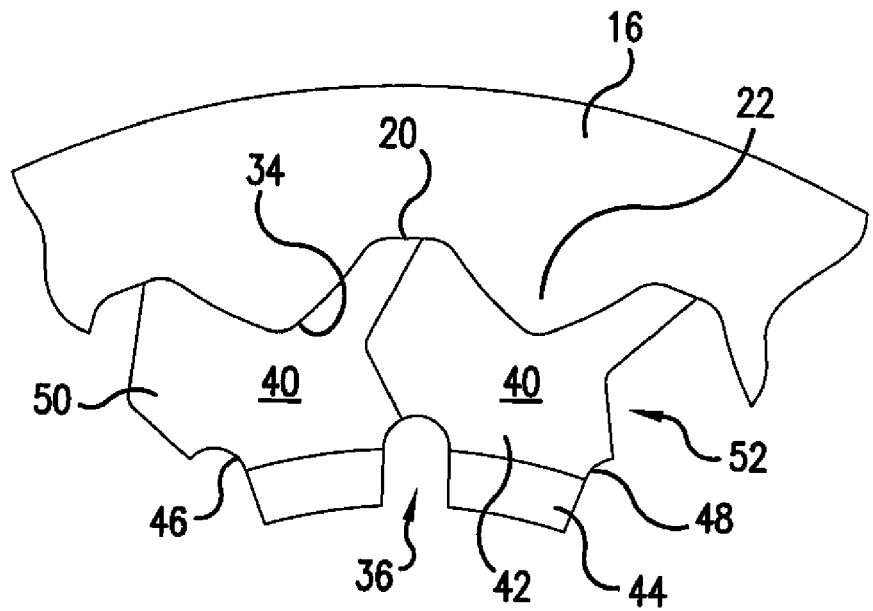
FIG. 5 is a detail view of circle V in FIG. 1.

Inner core element 24 is formed from a plurality of separate pieces 40 each having a thin portion 42 that forms thin portion 28 of inner element 34 and a thick portion 44 that forms thick portion 30 of inner element 34. Thin portion 42 of piece 40 includes one of the notches 34 of inner element 24, and piece 40 includes a first curved portion 46 and a second curved portion 48 that define parts of slots 36 when the pieces 40 are assembled as illustrated in FIG. 5. In this embodiment, notches 34 are formed entirely in individual ones of pieces 40 while slots 36 are formed by first and second curved portions 46, 48 of adjacent pieces 40. However, a single slot 36 could also be formed in a each piece 40 and/or notches 34 could be formed by appropriately shaped portions of adjacent pieces 40. Pieces 40 also include a projection 50 and an opening 52 complementary in shape to projection 50 for receiving the projection 50 of an adjacent piece 40.

Figure 7:
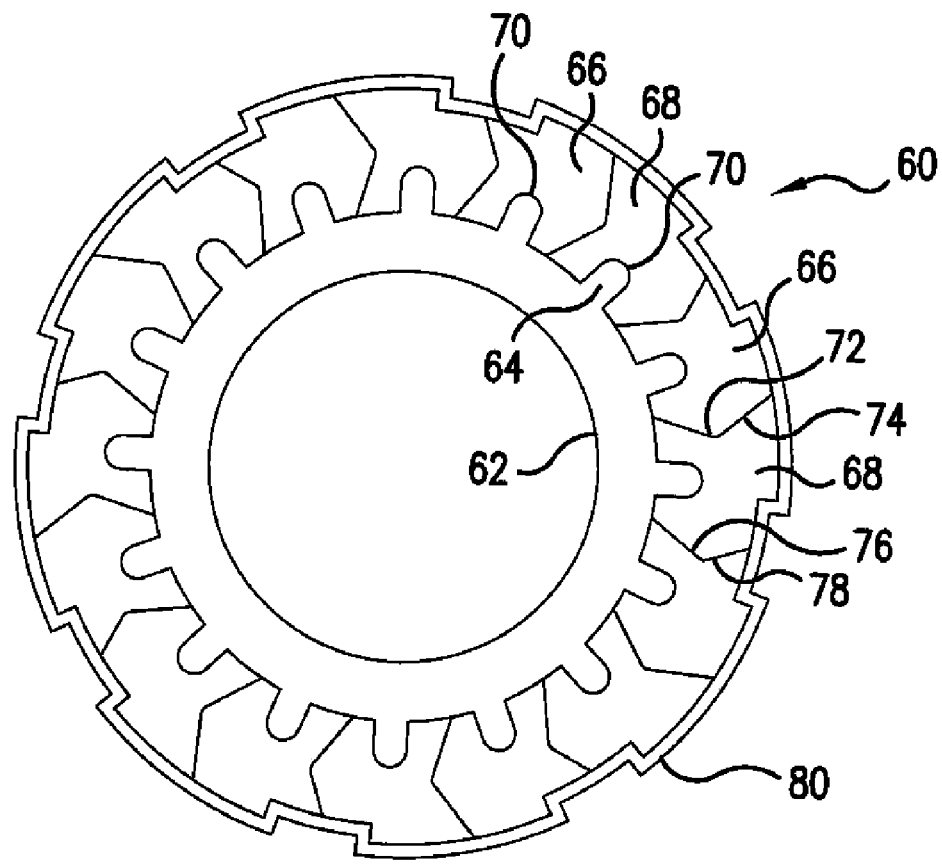
FIG. 7 is a top plan view of a core element according to an embodiment of the present invention intended for a brake rotor with load transfer lugs at the inner perimeter.
Figure 8:
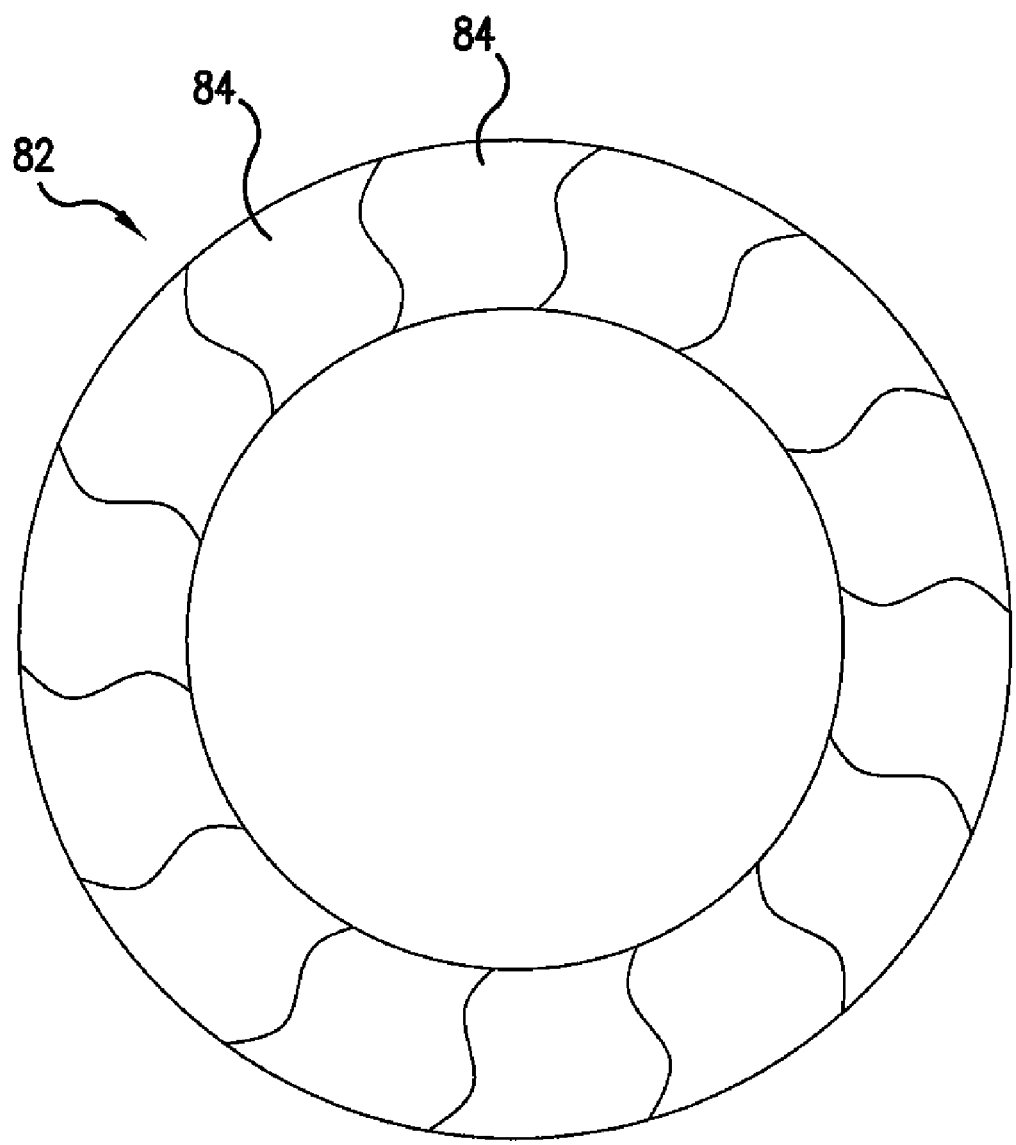
FIG. 8 is a top plan view of a core element according to an embodiment of the invention.

As illustrated in FIGS. 1 and 5, a plurality of pieces 40 can be assembled into an annular inner core element 24 by placing projections 50 of pieces 40 into openings 52 of adjacent pieces 40 inside outer element 16 to form an interlocking structure. In the present embodiment, each of pieces 40 is substantially identical; however, pieces having two or more different shapes may be used depending on the desired final shape of the annular element formed by the pieces. Pieces having two different shapes are illustrated in FIG. 7, for example, discussed below. It is desirable that the brake disk formed using core element 12 be mounted to an aircraft wheel so that forces are applied against core element 12 in the direction from openings 52 toward projections 50 or in a counterclockwise direction as viewed in FIG. 5.

The time required to form a brake disk using a CVD process is highly dependent upon the thickness of the part being processed and on the ratio of surface-area to volume. As the thickness increases or the surface-area-to-volume ratio decreases, the processing time increases. As discussed above, certain thick brake disks can require months of CVD processing time. The friction disks 14 and core element 12 described above are individually thinner than a standard brake disk and can therefore be formed more quickly than a single solid brake disk. In addition, the separate pieces 40 have a higher surface-area-to-volume ratio than the annular structure formed when pieces 40 are connected. Annular outer element 16 and pieces 40 can therefore be densified more rapidly than could a core element formed from a single piece of material or a conventional, solid, carbon-carbon composite brake disk. These thinner disks also require less machining between CVD process steps, further improving efficiency.

Carbon-carbon composite elements are generally formed from a mass of carbon fibers having the shape of the desired finished product. However, it is sometimes desirable to select a carbon fiber preform and to process that preform based on the shape of the finished product. Relatively flat articles, such as the friction disks 14 and outer core element 16 may be formed using a layered manufacturing approach such as through the use of a plurality of stacked polyacrilonitrile (PAN) fiber felt layers subjected to a CVD process. Parts having a more complex three-dimensional geometry, such as pieces 40, may advantageously be formed using random chopped fibers deposited into a mold that is then resin infused. Previously, it might have been necessary to use a mold to form an entire brake disk in order to obtain the three dimensional geometry of the thick portions 30 and slots 36 of the inner core element or corresponding slots on an inner periphery of a conventional solid brake disk. The method also allows parts not requiring such processing to be formed using other, less costly, methods.

Figure 3:
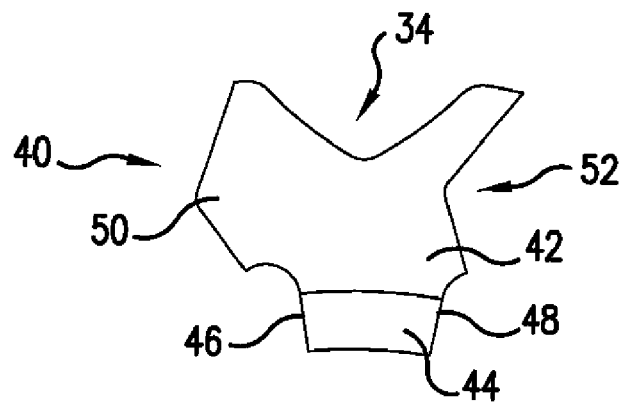
FIG. 3 is a top plan view of one of the inner pieces of FIG. 1.
Figure 9:
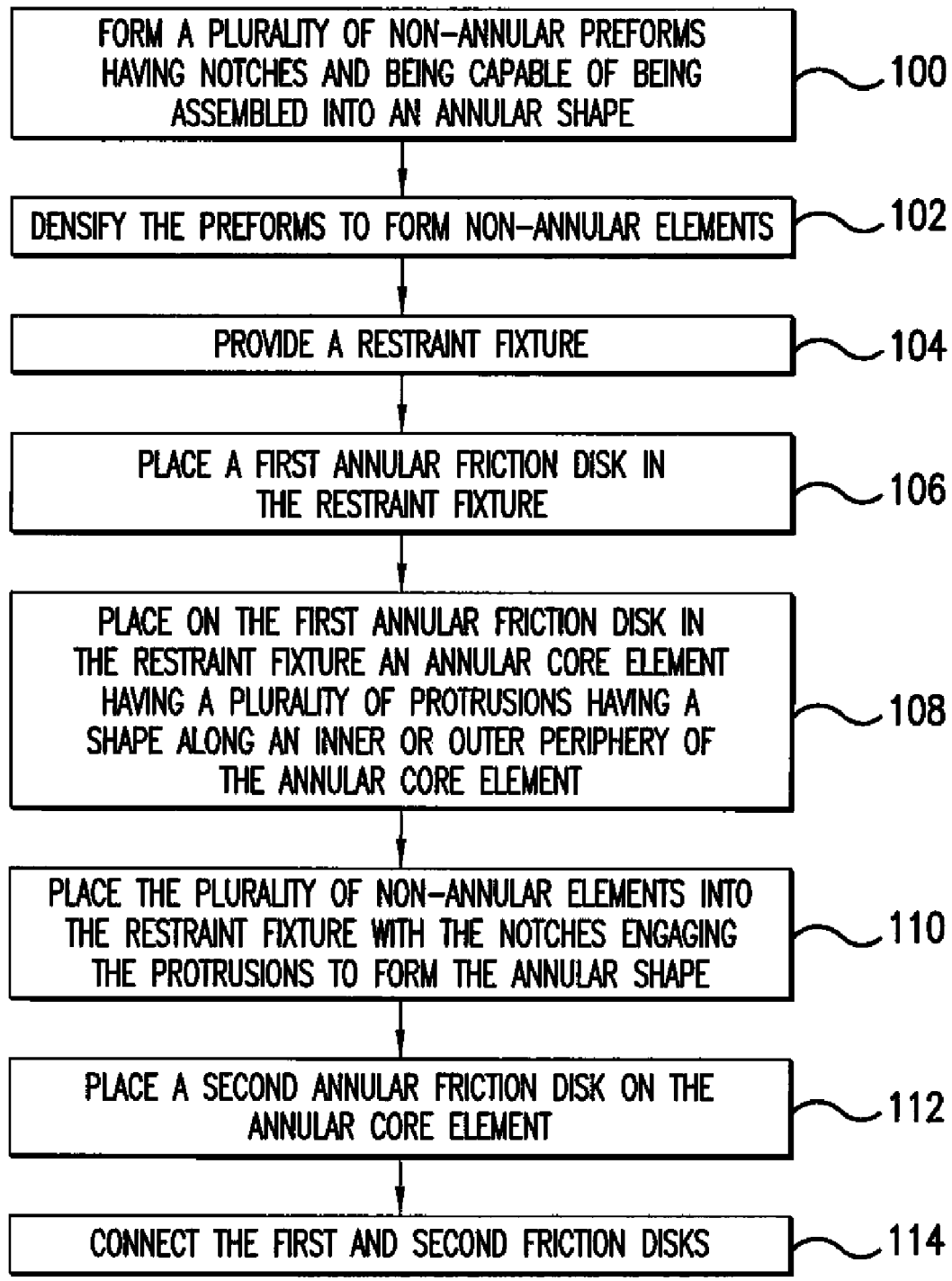
FIG. 9 is a flow chart illustrating a method according to an embodiment of the present invention.

A method of forming a brake disk is now described in connection with FIGS. 6 and 9. The method includes a step 100 of forming a plurality of non-annular preforms having notches 34 and being configured to be assembled into an annular shape and a step 102 of densifying the preforms to form non-annular elements having notches 34. Both the preforms and the elements will have the shape of piece 40 illustrated in FIGS. 3 and 4. The method further includes a step 104 of providing a restraint fixture, such as restraint fixture 54 illustrated in FIG. 6, and a step 106 of placing a first annular friction disk 14 into the restraint fixture 54. At a step 108, an annular core element, such as annular outer element 16 having protrusions 22, is placed on the first friction disk 14 in the restraint fixture, and at a step 110, the non-annular elements are placed in the restraint fixture with their notches 34 engaging the protrusions 22 on the annular element and their projections 50 engaging corresponding openings 52 in adjacent pieces 40. At a step 112, a second annular friction disk 14 is placed on the element 16 and at a step 114, the first and second friction disks are connected to each other and the core element using fasteners 56.

An additional benefit to assembling a brake disk from a plurality of elements as described above is that it allows for the replacement of less than all the brake disk when only limited portions are worn. For example, traditional carbon-carbon composite brake disks are often discarded when their friction surfaces are worn to a certain degree. This results in a waste of expensive carbon-carbon composite material. Using the present invention, the friction disks 14 can be discarded as they wear and replaced with new friction disks while reusing the same core elements. This results in the waste of a much smaller amount of carbon-carbon composite and, as discussed above, the replacement friction disks can be produced more economically than an entire, conventional, carbon-carbon composite brake disk. Furthermore, any damage to a conventional brake disk, damage to one of the lugs surrounding a slot 36, for example, would require replacement of the entire disk. The modular nature of the core element 12 allows for the partial replacement of the core element 12 when needed. For example, one or more damaged pieces 40 can be removed and replaced with corresponding new pieces 40 to prolong the useful life of the core element 12.

FIG. 7 illustrates a core element 60 for a friction disk according to an embodiment of the present invention which core element 60 may be used with first and second friction disks (not illustrated) as an aircraft rotor. Core element disk 60 includes an annular inner element 62 having a plurality of protrusions 64 extending from the outer periphery thereof and a plurality of first pieces 66 and second pieces 68 and each having a notch 70 for receiving one of the protrusions 64. First pieces 66 are different from second pieces 68, but each first piece 66 includes a projection 72 receivable in a corresponding opening 74 in each second piece 68 and each second piece 68 includes a projection 76 receivable in a corresponding opening 78 in first pieces 66. A retaining band 80 holds the first pieces 66 and second pieces 68 together, and first and second friction disks (14) can be connected to core element 60 to form a rotor. In this embodiment, it is desirable that the rotor be mounted so that forces are applied against the core element in the direction from openings 74 toward projections 76 or in the clockwise direction as viewed in FIG. 7.

A core element can be formed by assembling a plurality of separate pieces to the inner periphery of an annular element as illustrated in FIG. 1 or to the outer periphery of an annular core element as illustrated in FIG. 7. Which of these arrangements is used for a particular application will depend in part on the geometry of the part being formed. Alternately, an annular element 82 may be formed from a plurality of pieces 84 mutually connected to form an annular element without being mounted on an inner or outer periphery of a secondary annular element. Using this arrangement, a retaining band (not illustrated) might be required to hold the pieces in place, or the pieces 84 may be adequately retained between first and second friction disks such as disks 14.

The present invention has been described herein in terms of several embodiments. Modifications and additions to these embodiments will become apparent to those of ordinary skill in the art after reading the foregoing disclosure. It is intended that all such additions and modifications comprises a part of the present invention to the extent they fall within the scope of the several claims appended hereto.

We claim:

1. A method comprising:
   determining a required shape of a discrete, annular, carbon-carbon composite article;
   forming a plurality of non-annular preforms configured to be assembled into an annular shape;
   densifying the plurality of non-annular preforms to form a plurality of densified non-annular preforms; and
   assembling the plurality of densified non-annular preforms to form the discrete, annular, carbon-carbon composite article.

2. The method of claim 1, wherein forming a plurality of non-annular preforms comprises forming a plurality of substantially identical non-annular preforms.

3. The method of claim 1, wherein assembling the plurality of densified non-annular preforms comprises inserting a projection of a first one of the plurality of densified non-annular preforms into a complementary opening in a second one of the plurality of densified non-annular preforms.

4. The method of claim 1, wherein forming a plurality of non-annular preforms comprises forming a plurality of substantially identical non-annular preforms each having at least one projection and at least one opening complementary to the at least one projection, and wherein assembling the plurality of densified non-annular preforms comprises inserting the at least one projection of a first one of the plurality of densified non-annular preforms into the complementary opening in a second one of the plurality of densified non-annular preforms.

5. The method of claim 1, wherein the discrete annular carbon-carbon composite article comprises a first annular portion having a first thickness and a second annular portion having a second thickness greater than the first thickness, further comprising forming a first annular preform having the shape of the first annular portion and densifying the first annular preform, wherein assembling the plurality of densified non-annular preforms comprises assembling the plurality of densified non-annular preforms onto an inner or an outer periphery of the first annular preform to form the discrete annular carbon-carbon composite article.

6. The method of claim 5, wherein densifying the first annular preform comprises densifying the first annular preform using a first process, and wherein densifying the plurality of non-annular preforms comprises densifying the plurality of non-annular preforms using a second process different than the first process.

7. The method of claim 1, further including mounting a first unitary annular article to a first side of the discrete carbon-carbon composite article.

8. A brake disk comprising:
   an annular core comprising an annular first element having a first thickness and an inner or an outer periphery comprising a plurality of protrusions and an annular second element comprising a plurality of notches complementary to the protrusions, wherein the annular second element comprises a plurality of non-annular elements;
   a first friction disk mounted on a first side of the annular core;
   a second friction disk mounted on a second side of the annular core opposite from the first friction disk; and
   at least one fastener connecting the first and second friction disks to the annular core.

9. The brake disk of claim 8, wherein the annular second element comprises an inner element including a first portion having a second thickness greater than the first thickness.

10. The brake disk of claim 9, wherein the plurality of non-annular elements are substantially identical.

11. The brake disk of claim 9, wherein each non-annular element of the plurality of non-annular elements includes a projection and an opening complementary to the projection, wherein the projection of a first one of the plurality of non-annular elements is configured to be received in the opening of a second one of the plurality of non-annular elements.

12. The brake disk of claim 8, wherein the annular core is formed of a carbon-carbon composite material.

13. The brake disk of claim 8, wherein the first and second friction disks are formed from carbon-carbon composite material.

14. A method of assembling a carbon-carbon composite brake disk, the method comprising:
   forming a plurality of non-annular preforms comprising notches and configured to be assembled into an annular shape;
   densifying the plurality of non-annular preforms to form a plurality of densified non-annular elements;
   placing a first annular friction disk in a restraint fixture;
   placing on the first annular friction disk in the restraint fixture an annular core element including a plurality of protrusions having a shape along an inner or an outer periphery of the annular core element;
   placing the plurality of densified non-annular elements into the restraint fixture with the notches engaging the protrusions to form the annular shape;
   placing a second annular friction disk on the annular core element; and
   connecting the first and second friction disks.

15. The method of claim 14, wherein the protrusions of the annular core element are located on an inner periphery of the annular core element, and wherein placing the plurality of densified non-annular elements into the restraint fixture comprises placing the plurality of densified non-annular elements around the inner periphery of the annular core element with the notches engaging the protrusions.

16. The method of claim 14, wherein the protrusions of the annular core element are located on an outer periphery of the annular core element, and wherein placing the plurality of densified non-annular elements into the restraint fixture comprises placing the plurality of densified non-annular elements around the outer periphery of the annular core element with the notches engaging the protrusions.

17. The method of claim 14, further including:
   removing one of the first or second friction disks;
   inspecting the plurality of densified non-annular elements for damage; and
   replacing one or more of the plurality of non-annular elements showing damage with a respective undamaged, densified non-annular elements.

* * * * *